United States Patent [19]
Tamura

[11] Patent Number: 5,410,661
[45] Date of Patent: Apr. 25, 1995

[54] CHARACTER STRING COPYING METHOD

[75] Inventor: Norio Tamura, Kawasaki, Japan

[73] Assignee: Fujistu Limited, Kawasaki, Japan

[21] Appl. No.: 214,313

[22] Filed: Mar. 17, 1994

[30] Foreign Application Priority Data

Jun. 28, 1993 [JP] Japan .................................. 5-157221

[51] Int. Cl.6 .......................... G06F 7/00; G06F 13/00
[52] U.S. Cl. ................................... 395/375; 364/958.3; 364/254
[58] Field of Search ................ 395/375, 700, 775, 600

[56] References Cited

U.S. PATENT DOCUMENTS

| | | | |
|---|---|---|---|
| 4,829,294 | 5/1989 | Iwami | 340/723 |
| 5,150,312 | 9/1992 | Beitel | 395/118 |
| 5,161,245 | 11/1992 | Fenwick | 382/40 |
| 5,230,075 | 7/1993 | Premerlani | 395/600 |
| 5,274,807 | 12/1993 | Hoshea | 395/650 |
| 5,276,840 | 1/1994 | Yu | 395/425 |
| 5,283,880 | 2/1994 | Garza | 395/425 |
| 5,285,505 | 2/1994 | Kim | 382/13 |
| 5,313,646 | 5/1994 | Hendricks | 395/600 |

Primary Examiner—David Y. Eng
Attorney, Agent, or Firm—Staas & Halsey

[57] ABSTRACT

A fractional data processing is performed until a copy source character string comes to K-byte boundary (e.g., K=8). Then, a series of steps of loading data K-bytes at a time, generating data according to the byte-boundary of the copy destination, and storing data K bytes at a time are repeated. If there is any fractional data remaining at the end part of the character string, the fractional data is copied in the copy destination area.

3 Claims, 6 Drawing Sheets

TRANSFER DESTINATION IS 8m+i (i=1, 2, 3):

```
ldd  (re0, ro0)
srl  re0 ↑↑ re1
srl  ro0 ↑↑ ro1
sll  re0 ↑↑ re2
or   re2 | ro1 ↑↑ ro1
or   re1 | ro2 ↑↑ re1
std  (re1, ro1)
sll  ro0 ↑↑ ro2
add
add
b
```       } 11 INSTRUCTIONS

FIG. 5B

TRANSFER DESTINATION IS 8m+i (i=5, 6, 7):

```
ldd  (re0, ro0)
sll  re0 ↑↑ temp-r2
srl  ro0 ↑↑ temp-r1
or   ro1 | temp-r1
or   re1 | temp-r2
std  (re1, ro1)
srl  ro1 ↑↑ re1
sll  ro1 ↑↑ ro1
add
add
b
```       } 11 INSTRUCTIONS

FIG. 5C

TRANSFER DESTINATION IS 8m+4:

```
ldd  (re0, ro0)
mov  re0 → ro1
std  (re1, ro1)
mov  ro0 → re1
add
add
b
```       } 7 INSTRUCTIONS

FIG. 5D

TRANSFER DESTINATION IS 8m:

```
512-BYTE TRANSFER FUNCTION ( ) {
  ldd
  std
  ldd
  std
  ldd    } 64
  std
  ldd
  std
  . . .
  return }
```

FIG. 6A

```
ldub
std
ldub
std
ldub
std
ldub
std
ldub
std
ldub
std
ldub
std
ldub
std
add
add
b
```
19 INSTRUCTIONS

FIG. 6B

| TRANSFER DESTINATION | SIMPLE BYTE-TRANSFER | | EMBODIMENT OF THE INVENTION | |
|---|---|---|---|---|
| | (NUMBER OF INSTRUCTIONS) | (RATIO) | (NUMBER OF INSTRUCTIONS) | (RATIO) |
| $8m+0$ | 19 | 1.0 | 5 | 0.26 |
| +1 | 19 | 1.0 | 11 | 0.58 |
| +2 | 19 | 1.0 | 11 | 0.58 |
| +3 | 19 | 1.0 | 11 | 0.58 |
| +4 | 19 | 1.0 | 7 | 0.37 |
| +5 | 19 | 1.0 | 11 | 0.58 |
| +6 | 19 | 1.0 | 11 | 0.58 |
| +7 | 19 | 1.0 | 11 | 0.58 |

CHARACTER STRING COPYING METHOD

BACKGROUND OF THE INVENTION

1. Field of the Invention

The present invention relates to a method of copying at high speeds a character string on a reduced instruction set computer (RISC).

This invention can be applied to compilers for programming languages such as C language and FORTRAN on the RISC and also,to a library linked by a linker to object programs generated by the compilers. More specifically, this invention can be used in realizing the function of copying character strings in a program written in a programming language by an object program or library (subroutine) generated by the compiler.

2. Description of the Prior Art

Conventional complex instruction set computers (CISC) are provided with a "character string copying instruction." The use of such a complex instruction allows easy copying of a relatively long character string. The CISC instruction set has some problems: (1) Of a complex instruction set, very few are actually used frequently; (2) Complex (sophisticated) function instructions seldom coincide completely with functions required by the user and hence, are used at low frequencies; (3) When the instruction set is complicated, the logic circuits become complex accordingly, requiring longer time to interpret and execute the instructions. To solve these problems, a RISC architecture was conceived.

A RISC is a computer designed to simplify the instruction set, compared to the CISC, and to increase the speed of executing an object program output by the compiler. The features of the RISC architecture are as follows.

(1) One instruction is executed in one cycle.

(2) Reading and Writing from and into a memory is done by using load/store instructions. For other instructions, registers are used.

(3) The numbers of instructions and addressing steps are reduced to shorten the time to interpret and execute the instructions.

(4) An instruction format is fixed to unify the reading, interpretation and execution of instructions.

(5) Optimization such as of pipeline processing that depends on instructions is performed solely by a compiler.

In executing a program, a computer copying of relatively long character strings from one area of a memory to another is often required. Compilers and libraries on the conventional CISC have a character string transfer function realized by using a character string copying instruction. The RISC, however, does not have the character string copying instruction, so a character string is copied by using a load instruction and a store instruction repeatedly in units of one byte.

When a character string copying function is realized on a RISC computer, conventionally 1-byte data load and store instructions are repetitively executed according to the length of a character string to be copied. This method has a drawback of taking a long time to copy the character string.

SUMMARY OF THE INVENTION

An object of this invention is to solve the above-mentioned problem and to allow high-speed copying of a character string in a computer that does not have a character string copying instruction for copying a character string of an arbitrary length at a time.

This object of the present invention is achieved by a method for copying a character string in a computer system that has an instruction set which includes an instruction to load into registers K bytes at a time data located at a K-byte boundary K22 in a memory and an instruction to store data K bytes at a time into a memory location of K-byte boundary but which does not include a character string copy instruction to copy a character string of L bytes (L>K), the method comprising the steps of:

(a) copying a character string by an instruction having no K-byte boundary limitation until a character string of a copy source comes to a K-byte boundary;

(b) loading the character string of the copy source located at the K-byte boundary into registers K bytes at a selected time;

(c) processing the data loaded into the registers in units of K bytes and generating in the registers K-byte data that corresponds to a K-byte boundary area in a copy destination area;

(d) storing the generated K-byte data into a copy destination memory area;

(e) repeating the steps (b), (c) and (d) until all the K-byte data of the copy source character string are copied; and (f) coping data of less than K bytes, if remaining, of the copy source character string by an instruction having no K-byte boundary limitation.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
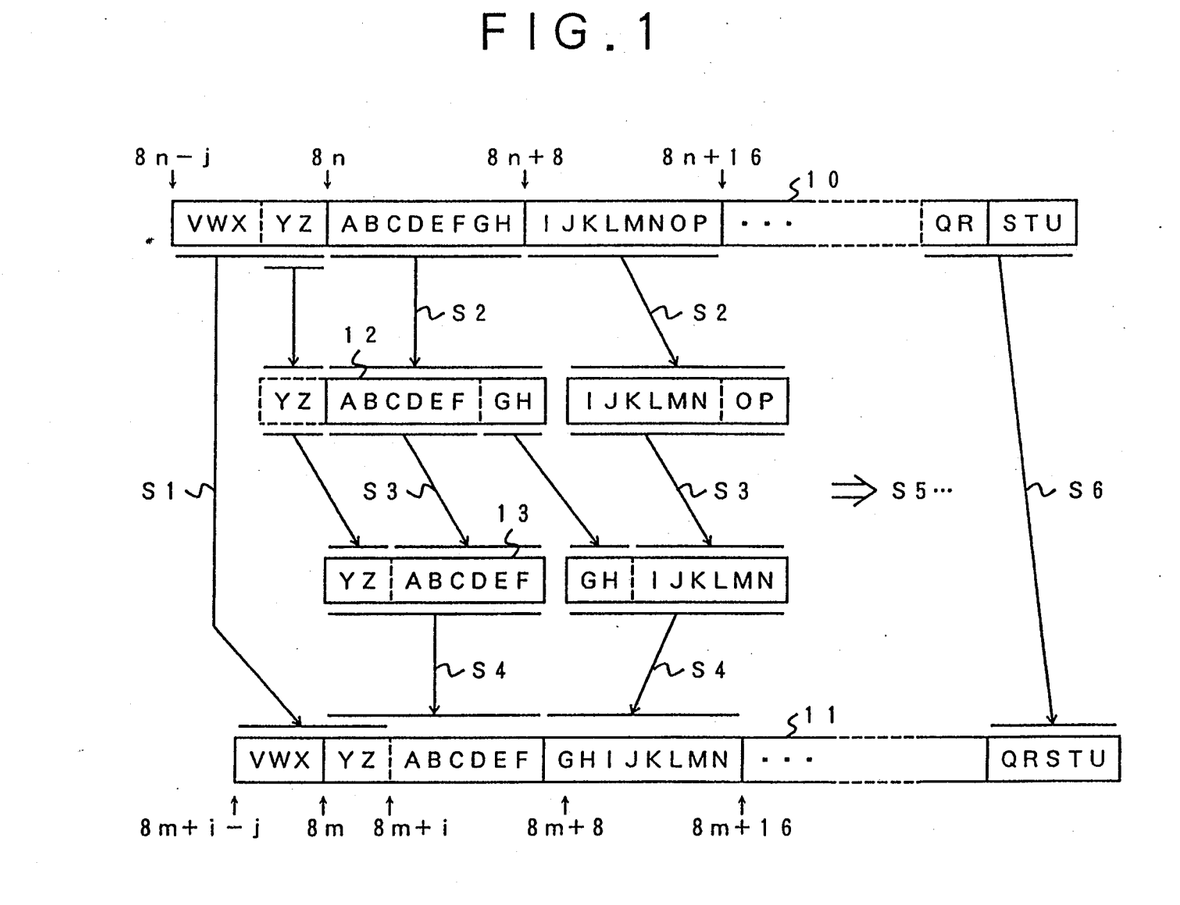
FIG. 1 is a diagram illustrating the principle of this invention.

FIG. 1 is a diagram illustrating the principle of this invention.

In the figure, reference numeral 10 represents a copy source area in a memory in which a character string to be copied is stored, 11 a copy destination area in the memory to which the copied character string is transferred; and 12 and 13 registers in which data in the memory is loaded and stored.

The present invention is used for copying character strings, in a computer system that has an instruction set which include an instruction to load into registers, data stored in a K-byte boundary memory area ($K \geq 2$) in units of K bytes and an instruction to store data in units of K bytes into a K-byte boundary memory area but which does not include a character string copy instruction to copy a character string of L bytes (L>K).

In step S1, a character string is copied by an instruction having no K-byte boundary limitation until the data of the character string being copied in the copy source area 10 is just before a K-byte boundary.

In the next step S2, the copy source character string after the K-byte boundary is loaded into a register 12 in units of K bytes.

In step S3, the data, loaded into the register 12 in units of K-bytes, is processed to generate in a register 13, K-byte data that corresponds to a K-byte boundary area in the copy destination area 11.

In step S4, the generated K-byte data is stored in the copy destination area 11.

The above steps S2 through S4 are repeated until all the copy source character string is copied (step S5).

Finally in step S6, when any data of less than K-bytes remains, the remaining data of the character string is copied into the copy destination area 11 by using an instruction having no K-byte boundary limitation. The step S1 and step S6 can be omitted when the K-byte boundary processing of fractional data is not necessary.

According to one aspect of this invention, the step S2 through step S5 are performed by executing a group of instructions prepared beforehand separately according to the distance of the storage locations in the copy destination area from the K-byte boundary.

According to another aspect of the invention, the program that executes the steps S1 through S6 is filed in a library and then incorporated into a program of execution form when the object program output from a compiler is integrated and edited.

According to this invention, in a register or a group of registers of 4, 8 or 16 bytes the copy source data is loaded and the data is stored in the copy destination area. By loading/storing data in units of K-bytes, it is possible to realize an excellent performance K times higher than that of the case where data is loaded/stored in units of 1 byte. In the following description, it is assumed that K=8.

Assume, as shown in FIG. 1, that the address of the copy source area 10 is 8n−j and the address of the copy destination area 11 is 8m+i−j (where n and m are integers; and i and j are integers from 1 to 7).

The basic idea of processing according to this invention is as follows.

(1) When the copy source and the copy destination are both of 8-byte boundary area, the load and store operations in units of 8 bytes are repeated.

(2) When the address of the copy source is 8n (8-byte boundary) and the address of the copy destination is 8m+i (i=1 to 7), the copy source data in the 8-byte boundary area is loaded into registers and then is merged with i bytes already loaded in the previous loop to generate, in the registers, 8-byte data to be stored in the 8-byte boundary area (8m) and to store the data in the area.

Concrete steps for the above processing will be described below.

In step S1, simple copying is repeated one byte at a time until the data in the copy source area 10 comes to an 8n-byte boundary. More specifically, a character string "VWXYZ" is copied one byte at a time.

Next, in step S2, 8-byte data is loaded just after the 8-byte boundary (8n) in the copy source area into a register 12. The storage location in the copy destination area 11 to which this data is to be copied is 8m+i. When i is not zero, the storage location is not at the 8-byte boundary.

In step S3, in the register 13, data which has i bytes previously processed is shifted and the 8-byte boundary is added to the front of the data.

Then in step S4 the data in the register 13 (character string "YZABCDEF") is stored at an address 8m in the copy destination area 11.

Similarly, the steps are repeated and in the next step S2 a character string "IJKLMNOP" is loaded into the register 12; in the step S3 this data is shifted and a character string "GH" of previous data is added to the front of the data; and in step S4 the data is stored at an address 8m+8 in the copy destination area 11.

The steps S2 through S4 are repeated, and in step S5 a check is made to see if this copying should be terminated. When there is no more 8-byte character string data uncopied in the copy source area 10, in step 6 a simple one-byte copying of the remaining character string "QRSTU", and the character string copy is ended.

By the above processing, it is possible to perform copying in units of 8-byte even of a character string not stored just within 8-byte boundaries, except for the head and tail portions, thereby increasing the speed of the character string copying.

Particularly by preparing in advance a group of instructions separately for 8-byte data transfer loops (steps S2 through S5) according to a distance (value i) of the storage locations in the copy destination area 11 from the 8-byte boundaries, the processing can be executed by optimum instructions.

The above-mentioned character string copy processing may be realized with a subroutine or a functionalized program, which is then filed in a library. This method increases the execution speed of application programs without requiring special measures on the part of the application programs.

Figure 2:
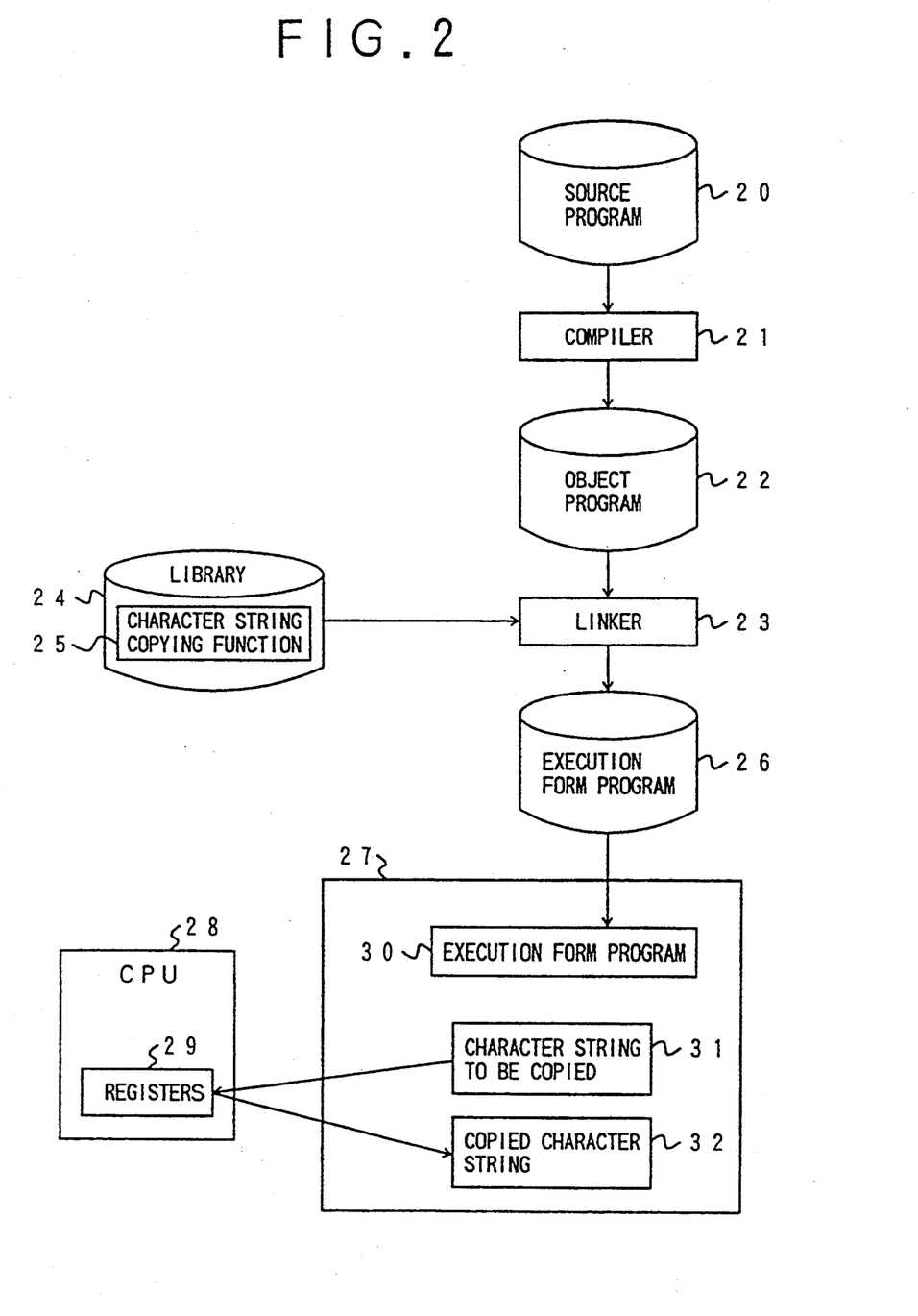
FIG. 2 is a schematic diagram showing an example system to which this invention is applied.

FIG. 2 shows a system to which the present invention is applied.

In FIG. 2, reference numeral 20 represents a source program written in a programming language such as C language or FORTRAN; 21 a compiler for interpreting the source program 20; 22 an object program made by interpreting the source program 20; 23 a linker that links and edits the object program 22 in an execution form; 24 a library in which programs which are to be linked to the object program 22 are stored; 25 a character string copying function; 26 a program of execution form obtained by editing the object program 22 in a execute form; 27 a memory; 28 a central processing unit (CPU) having an instruction execution function; 29 registers in which data to be processed is stored by an instruction; 30 a program of execution form loaded in the memory 27; 31 a character string to be copied; and 32 a copy of a character string.

The CPU 28 is, for example, a SPARC microprocessor (trade name, produced by Sun Microsystems in U.S.), a representative RISC chip, which has a restriction that 8-bytes data need to be aligned with 8-byte boundaries so as to be loaded/stored. The registers 29 are each 4 bytes long and it is possible to combine an even-numbered register and an odd-numbered register and use them as an 8-byte register. In the following description, even-numbered registers are represented by re0, re1, ... , and the odd-numbered registers by ro0, ro1, ...

In order to copy a long character string in a program, an instruction statement for calling a character copying function 25 is written in the source program 20. The source program 20 is compiled by the compiler 21, and the resultant object program 22 and the library 24 are linked and edited by the linker 23. As a result, the program 26 of execution form, incorporating a group of instructions for calling the character string copying function 25, is generated.

When the execution form program 26 is loaded into the memory 27 and the character string copying function 25 in the loaded execute-form program 30 is called, the character string copying function 25 copies the original character string 31 to the copy destination character sting 32 by using the register 29. This invention is implemented by this character string copying function 25.

Figure 3:
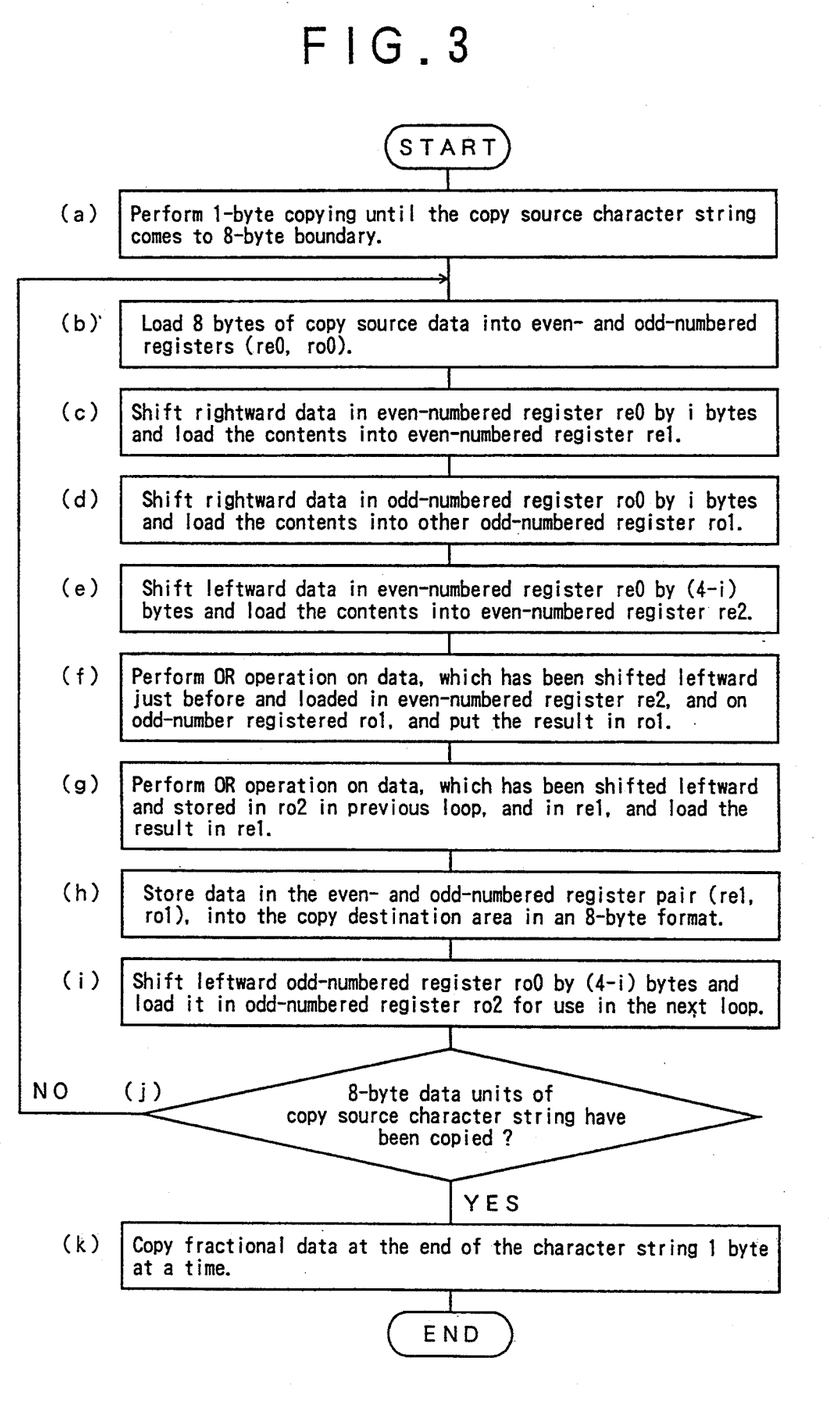
FIG. 3 is a flowchart of an embodiment of this invention.
Figure 4A:
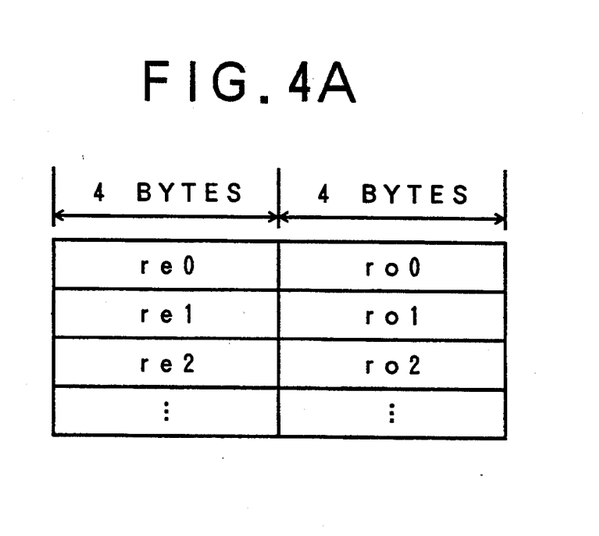
FIGS. 4A and 4B are diagrams illustrating the operation of the embodiment of this invention.
Figure 4B:
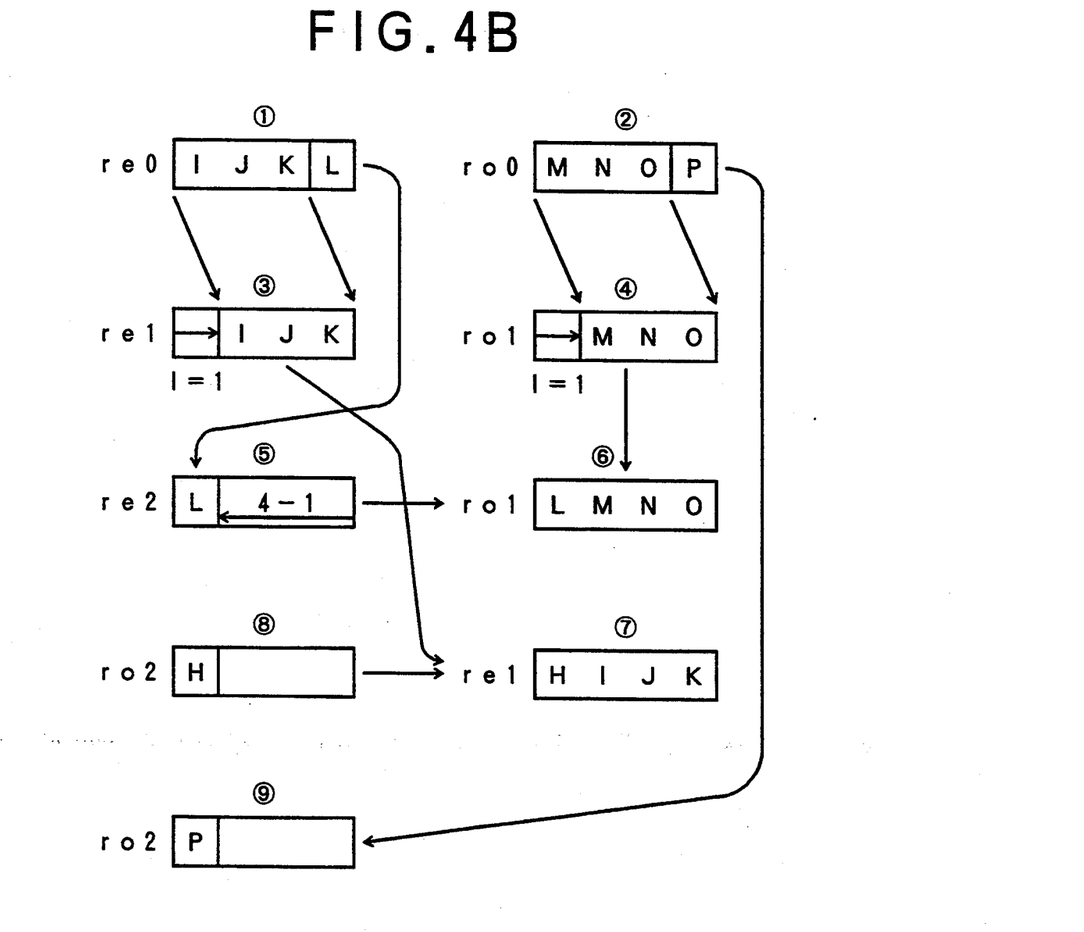

FIG. 3 is a flowchart of an embodiment of this invention. FIGS. 4A and 4B are diagrams illustrating an example operation of the embodiment. The operation will be explained according to the steps (a) through (k) in FIG. 3. It is assumed that, as shown in FIG. 4A, each register is 4 bytes long and that even-numbered registers and odd-numbered registers are paired to allow loading/storing 8 bytes at a time.

(a) A 1-byte copying is repeated until the copy source character string comes to an 8-byte boundary. In correspondence with the 8-byte boundary 8n, the copy destination boundary is 8m+i, where i is an integer of 0, 1, 2, 3, 4, 5, 6 or 7. According to the value of i, appropriate data transfer is performed in units of 8 bytes. For example, let i = 1. For the following loop processing, i-bytes of data at the time of transfer is left in the odd-numbered register ro2.

(b) 8-byte data of the copy source is loaded into the pair of even-numbered register re0 and odd-numbered register ro0 ((1) and (2) in FIG. 4B).

(c) The even-numbered register re0 is shifted rightward by i bytes and its contents are loaded into another even-numbered register re1 ((3) in FIG. 4B).

(d) The odd-numbered register ro0 is shifted rightward by i bytes and its contents are loaded into another odd-numbered register ro1 ((4) in FIG. 4B).

(e) The even-numbered register re0 is shifted leftward by (4−i) bytes and its contents are loaded into another even-numbered register re2 ((5) in FIG. 4B).

(f) The data stored in the even-numbered register re2, which has been shifted leftward just before, and the odd-numbered register ro1 are ORed and the result is put in the odd-numbered register ro1 ((6) in FIG. 4B).

(g) The data that has been shifted leftward in the previous loop ((8) in FIG. 4B) and the data in the even-numbered register re1 are ORed and the result is put in the even-numbered register re1 ((7) in FIG. 4B).

(h) The data in the pair of even-numbered register re1 and odd-numbered register ro1 is stored in the copy destination area in 8-byte boundary addressing.

(i) The data in the odd-numbered register ro0 is shifted leftward by (4−i) bytes and the resultant contents are loaded into the odd-numbered register ro2 for use in the next loop ((8) in FIG. 4B).

(j) A decision is made as to whether all the 8-byte data of the copy source character string have been copied. If not, processing returns to step (b) and performs a similar processing of the next 8 bytes of data.

(k) If there is no more 8-byte data, fractional data less than 8 bytes long at the end part of the data is copied in units of one byte to terminate the processing.

The loop of step (b) through step (j) shown in FIG. 3 differs depending on the value of i of the byte boundary 8m+i in the copy destination. FIGS. 5A through 5D shows a series of instructions for the transfer loop according to the value of i. In FIGS. 5A through 5D, symbol ldd represents a load instruction to load 8 bytes of data into the pair of even-numbered register and odd-number registered. Symbol srl represents a rightward shift instruction to shift data rightward in a register. Symbol sll is a leftward shift instruction to shift data leftward in a register. Symbol or means a logical summation instruction that calculates the logical sum of data of two registers. Symbol std is an instruction to store 8-byte data loaded in the pair of even- and odd-numbered registers. Symbol add is an addition instruction; b a branch instruction; and mov an instruction to transfer data from one register to another.

Figure 5A:
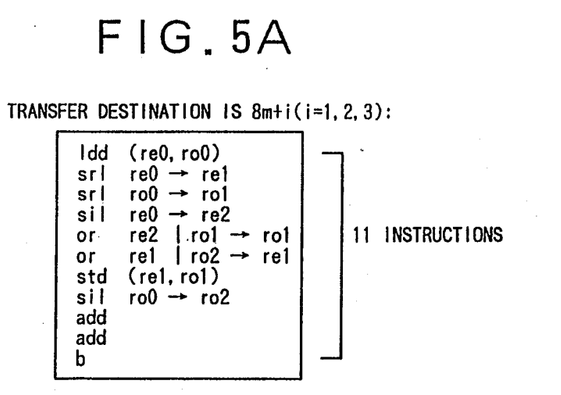
FIGS. 5A, 5B, 5C and 5D are diagrams showing series of instructions to process a transfer loop in the embodiment of this invention.

When the copy destination is the boundary of 8m+i (i=1, 2, 3), data transfer in units of 8 bytes is performed by a series of instructions shown in FIG. 5A. This series of instructions execute the steps shown in the flowchart of FIG. 3. The add instruction increments the address of the copy source and of the copy destination by 8 bytes.

Figure 5B:
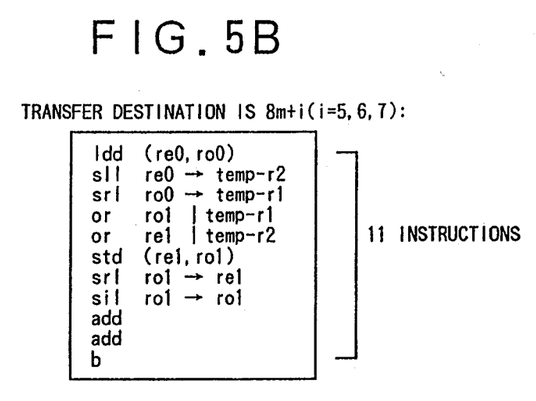

When the boundary of the copy destination is at 8m+i (i=5, 6, 7), instructions shown in FIG. 5B are used to transfer data 8 bytes at a time. Here, temp-r1 and temp-r2 represent work registers that are used temporarily. The processing steps are the same as explained in the flowchart of FIG. 3. The processing of aligning the data with the 8-byte boundary of the copy destination differs from the case of FIG. 5A.

Figure 5C:
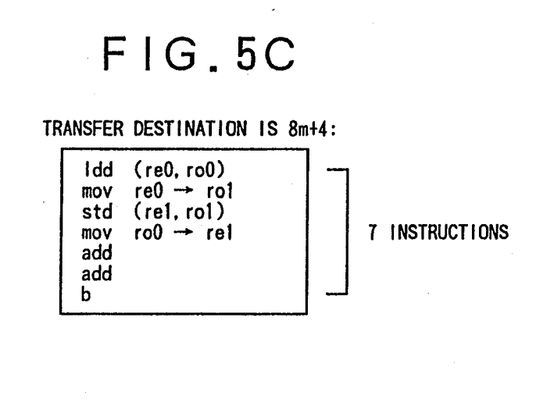

When the boundary of the copy destination is at 8m+4, a series of instructions shown in FIG. 5C are used to transfer data 8 bytes at a time. Since the data length for register is 4 bytes, there is no need of shifting. By using the mov instruction to move data between registers, the data is moved 4 bytes in each loop to prepare copy data in units of 8 bytes.

Figure 5D:
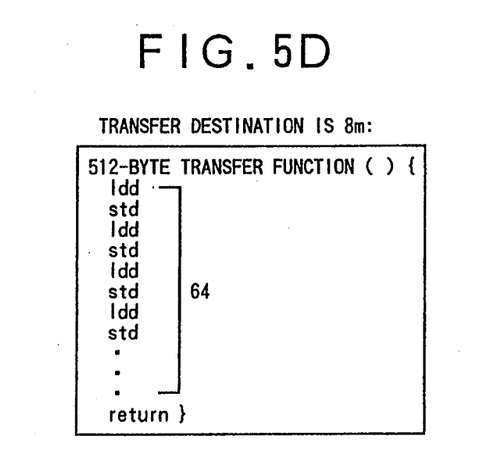

When the boundary of the copy destination is at 8m, i.e. at 8-byte boundary, a character string can be transferred by a combination of only the 8-byte data load instruction and the 8-byte data store instruction. In this embodiment, to reduce the number of branch instructions, internal functions consisting of a simple combination of ldd/std instructions are provided, which perform four different block transfers: 128-, 256-, 512- and 1024-byte transfers. These functions are selectively called in consideration of the length of the character string to be transferred and the fraction portion less than 8 bytes long. FIG. 5D shows a case of 512-byte transfer function, in which the 8-byte data load (ldd) instruction and store (std) instruction are repeated 64 times. By an internal function for 1024-byte transfer these instructions are repeated 128 times. By providing these block transfer functions, it is possible to reduce the number of branch instructions for loop, increasing the speed of processing.

Figure 6A:
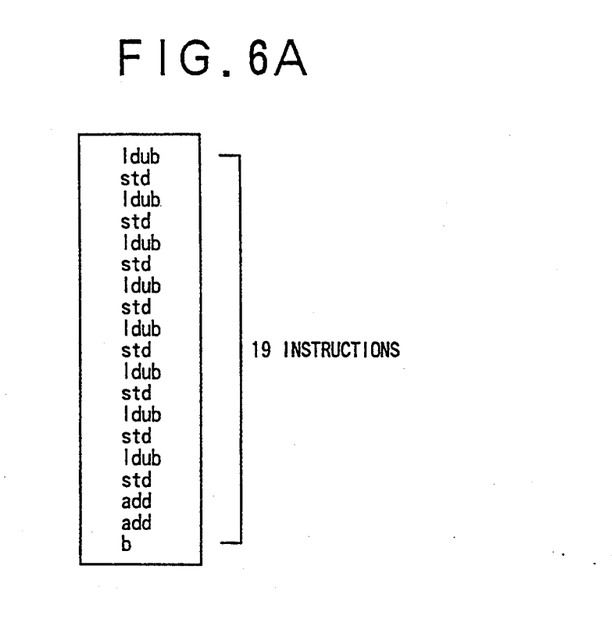
FIGS. 6A and 6B are performance comparison diagrams for illustrating the effects of this invention.
Figure 6B:
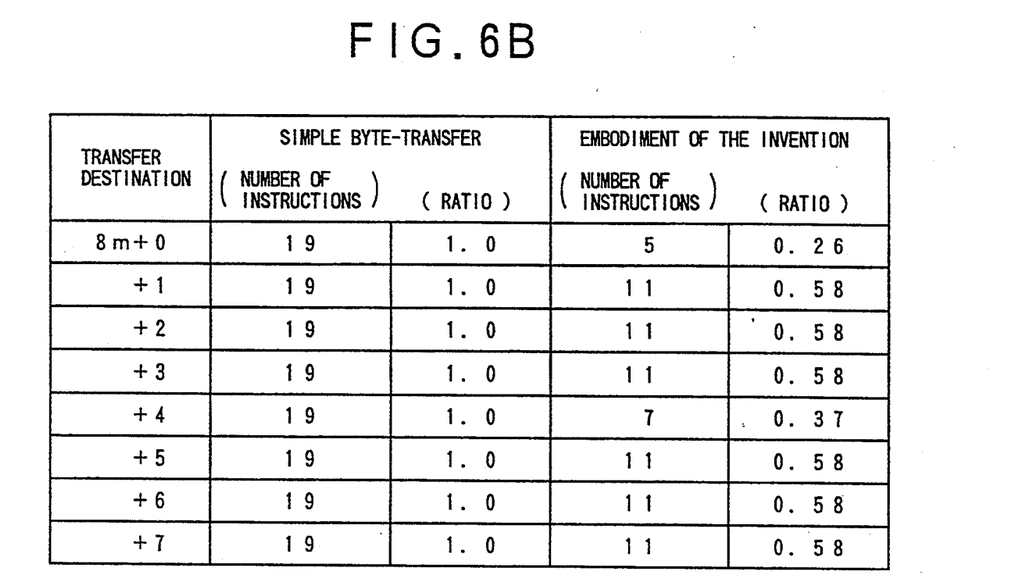

FIGS. 6A and 6B are performance comparison diagrams illustrating the advantages of this invention.

The processing of the transfer loop shown in FIGS. 5A through 5D is compared with the processing by a conventional simple byte-transfer. It is assumed that, after the initial processing on the fractional data, the copy source area is at 8n-byte boundary.

An instruction set for a conventional simple byte-transfer is shown in FIG. 6A. Instruction ldub is a 1-byte load instruction and stb a 1-byte store instruction. In this case, the number of instructions is 19, as shown in FIG. 6A, wherever the transfer destination lies on an 8m+i (i=0 through 7) boundary.

In contrast, in the embodiment of the present invention, when the transfer destination lies at 8m+O (8-byte boundary), the copying of a character string in units of 8 bytes can be performed by five instructions: an 8 byte data load (ldd) instruction, an 8-byte data store (std) instruction, address addition (add) instructions for transfer source and transfer destination, and a branch instruction. Thus, the performance ratio is 5/19=0.26 in contrast to the ratio 1.0 in the case of simple byte transfer.

When the transfer destination is at 8m+i (i=1, 2, 3), the set of instructions used are as shown in FIG. 5A and the number of instructions is 11. Hence, the performance ratio is 11/19=0.58.

When the transfer destination is at 8m+4, the series of instructions used are as shown in FIG. 5C and the number of instructions is 7. The performance ratio therefore is 7/11=0.37.

When the transfer destination is 8m+i (i=5, 6, 7), the instructions used are as shown in FIG. 5B and the number of instructions is 11. Thus, the performance ratio is 11/19=0.58.

As explained above, this invention realizes high-performance copying of character strings on a computer with a RISC architecture.

The present invention is not limited to the specifically disclosed embodiment, and variations and modifications may be made without departing from the scope of the present invention.

What is claimed is:

1. A method for copying a character string in a computer system that has an instruction set which includes an instruction to load into registers, K bytes at a time, data located at a K-byte boundary in a memory and an instruction to store data, K bytes at a time, into a memory location at a K-byte boundary, where said instructions do not include a character string copy instruction to copy a character string of L bytes, where L is greater than K, said method comprising the steps of:
   (a) copying a portion of the character string, from a copy source to a copy destination in response to a first instruction, the portion of the character string having no K-byte boundary limitation, until the portion of the character string of the copy source comes to a K-byte boundary;
   (b) loading a K-byte unit of the character string, of the copy source located at the K-byte boundary, as data, into registers;
   (c) processing the data loaded into the registers and generating, in the registers, K-bytes of data that correspond to a K-byte boundary area in the copy destination area;
   (d) storing the K-bytes of the data, generated in the registers, in the copy destination memory area;
   (e) repeating the copy, loading and processing of steps (b), (c) and (d) for each successive K-byte unit of the character string located at each successive K-byte boundary until all K-byte units of the character string in the copy source are copied; and
   (f) copying data of less than K bytes, if remaining, of the character string in the copy source by the instruction having no K-byte boundary limitation.

2. The method as claimed in claim 1, further comprising the step of executing the steps (b), (c), (d) and (e) by executing a set of instructions previously prepared based on a distance from a K-byte boundary of a storage location in the copy destination area.

3. The method as claimed in claim 1, further comprising the step of executing the steps (a), (b), (c), (d) and (e) by performing a program in a library, said program being incorporated into an object program during a linking and an editing of the object program.

* * * * *

UNITED STATES PATENT AND TRADEMARK OFFICE
CERTIFICATE OF CORRECTION

PATENT NO. : 5,410,661
DATED : April 25, 1995
INVENTOR(S) : Norio Tamura

It is certified that error appears in the above-indentified patent and that said Letters Patent is hereby corrected as shown below:

Column 5, line 15, delete "register" and insert therefor --registers--.

Column 6, line 35, delete "for" and insert --of--.

Signed and Sealed this

Twenty-second Day of August, 1995

Attest:

BRUCE LEHMAN

Attesting Officer

Commissioner of Patents and Trademarks